United States Patent
Bryson et al.

(10) Patent No.: US 10,389,760 B2
(45) Date of Patent: Aug. 20, 2019

(54) ADAPTIVE NETWORK SECURITY POLICIES

(71) Applicant: TREND MICRO INCORPORATED, Tokyo (JP)

(72) Inventors: Harry Bryson, Musselburgh (GB); Malcolm Dodds, Longniddry (GB); Wei Lu, Austin, TX (US); Julian Palmer, Edinburgh (GB)

(73) Assignee: TREND MICRO INCORPORATED, Tokyo (JP)

( * ) Notice: Subject to any disclaimer, the term of this patent is extended or adjusted under 35 U.S.C. 154(b) by 378 days.

(21) Appl. No.: 14/912,665

(22) PCT Filed: Aug. 19, 2013

(86) PCT No.: PCT/US2013/055577
§ 371 (c)(1),
(2) Date: Feb. 18, 2016

(87) PCT Pub. No.: WO2015/026314
PCT Pub. Date: Feb. 26, 2015

(65) Prior Publication Data
US 2016/0205143 A1    Jul. 14, 2016

(51) Int. Cl.
*G06F 17/00* (2019.01)
*H04L 29/06* (2006.01)

(52) U.S. Cl.
CPC ............ *H04L 63/205* (2013.01); *H04L 63/02* (2013.01); *H04L 63/1433* (2013.01); *H04L 63/1425* (2013.01)

(58) Field of Classification Search
USPC .......................................................... 726/1
See application file for complete search history.

(56) References Cited

U.S. PATENT DOCUMENTS 7,647,622 B1  1/2010  Sobel et al.
8,365,278 B1  1/2013  Njemanze et al.
(Continued)

FOREIGN PATENT DOCUMENTS

WO  WO-2010055515 A1  5/2010

OTHER PUBLICATIONS

International Search Report & Written Opinion, PCT Patent Application No. PCT/US2013/055577, dated Feb. 28, 2014, 10 pages.
(Continued)

*Primary Examiner* — Anthony D Brown
*Assistant Examiner* — Samuel Ambaye
(74) *Attorney, Agent, or Firm* — Okamoto & Benedicto LLP

(57) ABSTRACT

A method and system for dynamic identification of network security policies are provided. The method comprises inspecting network traffic using a number of network inspection technologies; executing a first network security system to implement a first number of security policies to respond to a first number of threats identified by the number of network inspection technologies; executing a second network security system to implement a second number of security policies to respond to a second number of threats identified by the number of network inspection technologies; obtaining security intelligence from the first and second network security system; and adaptively reassessing the first and second number of security policies based on the security intelligence.

6 Claims, 4 Drawing Sheets

(56) References Cited

U.S. PATENT DOCUMENTS

| | | | |
|---|---|---|---|
| 8,370,947 B2 | 2/2013 | Zaitsev et al. | |
| 8,478,708 B1* | 7/2013 | Larcom | G06Q 10/10 |
| | | | 706/52 |
| 8,693,344 B1* | 4/2014 | Adams | H04L 41/0893 |
| | | | 370/241 |
| 2010/0125912 A1 | 5/2010 | Greenshpon et al. | |
| 2011/0131658 A1 | 6/2011 | Bahl | |
| 2011/0252327 A1* | 10/2011 | Awasthi | H04L 43/045 |
| | | | 715/736 |
| 2012/0240185 A1 | 9/2012 | Kapoor et al. | |
| 2013/0055342 A1 | 2/2013 | Choi et al. | |
| 2013/0111548 A1 | 5/2013 | Kanoun et al. | |
| 2013/0291088 A1* | 10/2013 | Shieh | H04L 63/0218 |
| | | | 726/11 |
| 2014/0153435 A1* | 6/2014 | Rolette | H04L 63/0245 |
| | | | 370/252 |

OTHER PUBLICATIONS

Unknown., "Palo Alto Next Generation Firewall", Retrieved from http://manna-in-the-wild.hubpages.com/hub/Palo-Alto-Next-Generation-Firewall, Feb. 2010, 38 pages.

* cited by examiner

ADAPTIVE NETWORK SECURITY POLICIES

BACKGROUND

Network security systems may be utilized to enhance the security and/or the performance of a computing network. For example, a network security system may block traffic that is seeking resolution of a domain name, such as those reportedly involved in a malicious activity. Malicious activities can include distributed denial of service attacks or sending spam, for example, among others.

DETAILED DESCRIPTION

Figure 1:
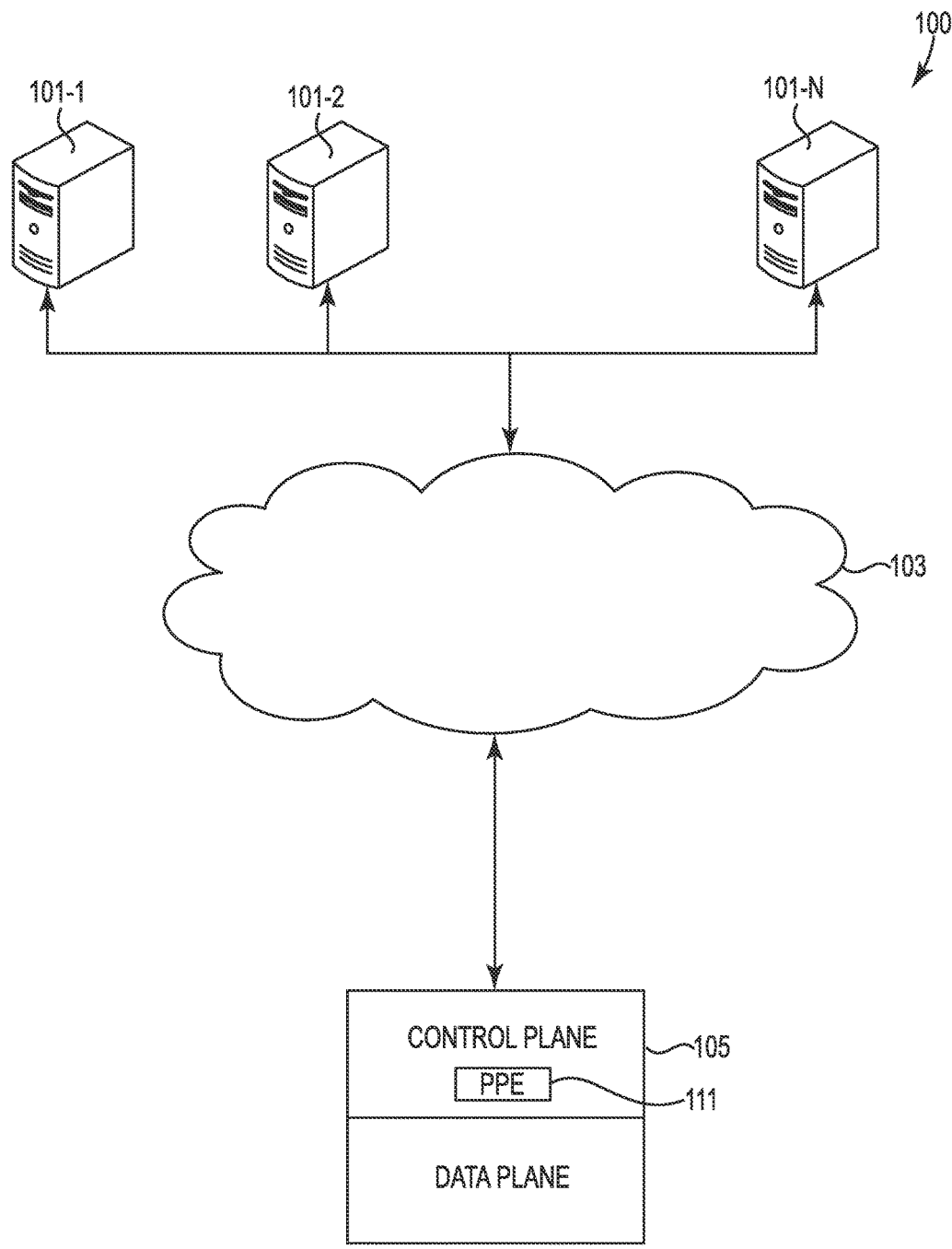
FIG. 1 is an example of an environment for adaptive network security policy reassessment according to the present disclosure.

An entity can implement network security systems to protect against vulnerabilities in their networks. A vulnerability can include a flaw and/or weakness in the network's design, implementation, operation, and/or management that could be exploited to violate the network's security policy (e.g., a circumstance and/or event with the potential to adversely impact a network through unauthorized access, destruction, disclosure, and/or modification of an asset of the entity). A threat can include information regarding a potential security attack. A security attack can include a use and/or attempted use of a threat against a vulnerability.

To avoid potential security attacks and/or mitigate identified security attacks, an entity can perform an investigation (e.g., monitor network traffic using a number of inspection technologies) to glean security intelligence. Security intelligence can include information regarding security attacks, threats, vulnerabilities, sources and/or destinations of network traffic, and/or network traffic type. However, examples are not so limited, and security intelligence can include a number of different types of information regarding the safety and/or risk associated with computer-readable instructions, data, data sources, and/or a sequence of commands. In some examples, security intelligence can include information regarding a safe operation (e.g., computer-readable instructions, data, data sources, and/or a sequence of commands that is not considered a security attack, a threat, and/or vulnerability). As used herein, "a" or "a number of" something can refer to one or more such things. For example, "a number of inspection technologies" can refer to one or more inspection technologies.

Based on security intelligence, an entity can deploy a number of different network security systems. For instance, an entity can deploy network Firewalls (FW) to prevent unwanted access to the network, Web Application Firewalls (WAF) to defend against web based application attacks, Intrusion Prevention Systems (IPS) to protect against network based intrusions to networked resources, and/or Data Loss Prevention (DLP) systems to inspect network content. However, examples are not so limited, and network security systems can include a number of different technologies that enhance, enable, and/or support the protection of a network and/or network resources. Other examples of network security systems can include web security gateways, email security gateways, Distributed Denial of Service (DDoS) systems and/or content control systems, to name a few.

Many entities deploy single purpose network security systems (e.g., network security systems that operate independently from one another). For example, an entity may deploy a FW, an IPS, and a DLP system. In this example, the FW can execute its own independent security policy engine when an individual networking session is established, the IPS can evaluate its own security policy engine when a signature of malicious network traffic is detected, and the DLP system can evaluate its own security policy engine when a pattern of sensitive data is matched. In other words, each network security system executes its own independent security policy engine, which is based on that specific network security system's limited view of network traffic.

However, entities are facing a growing number of Advanced Persistent Threats (APTs) that are intermingled with regular network traffic, originating from both reputable and compromised sites. As used herein, an APT can include an attack in which an entity gains unauthorized access to a network and remains undetected for an extended period of time. Single purpose network security systems, with their limited context and static policy decisions, are increasingly ineffective against APTs and may allow a threat to remain undetected on a network for an extended period of time. In contrast, in accordance with examples of the present disclosure, a progressive policy engine (PPE) can integrate a number of different network security systems such that security intelligence obtained from one network security system can affect security policies implemented by other network security systems. Additionally, the PPE can integrate the combined knowledge and history from a number of network security systems and constantly re-assess the appropriate security policy and/or security policies to apply.

FIG. 1 is an example of an environment 100 for dynamic network security policy reassessment according to the present disclosure. FIG. 1 illustrates components of the environment 100, which are discussed further herein. The environment 100 can include a number of network devices 101-1, 101-2, . . . , 101-N. The number of network devices 101-1, . . . , 101-N can include any number of different devices, including for example, a stand-alone computer, a workstation, a printing station, a server, a router, a database, and/or a switch among other devices. Each of the number of network devices 101-1, . . . , 101-N can be coupled to a network 103, to which security intelligence may be communicated. Network 103 can include a number of different distributed computing systems, including the Internet, a Local Area Network (LAN), a Personal Area Network (PAN), a Virtual Private Network (VPN), and/or an organizational Intranet, to name a few. The network 103 and/or the network devices 101-1, . . . , 101-N can utilize a number of different network security systems to support network security. For example, the network 103 and/or the network devices 101-1, . . . , 101-N can utilize stateful firewalling systems, IPS, reputation-based control systems, Application Identification Systems (AISs), secure network tunneling, and/or application content filtering, among other network security systems.

In a number of examples of the present disclosure, environment 100 can include an integrated network security system 105. The integrated network security system 105 can be implemented on a stand-alone computer system, such as a personal computer and/or workstation. In other examples, the integrated network security system 105 can be implemented by a number of devices distributed across a network 103. As discussed further herein, the integrated network security system 105 can include a control plane and/or a data plane to implement a PPE 111. A PPE 111 can integrate the security intelligence from the number of different network security systems, and dynamically re-assess the appropriate security policy and/or security policies to apply to the network traffic.

A data plane, as used herein, can include computer readable medium (CRM) and/or hardware to obtain security intelligence from a number of different network security systems, and correlate security intelligence to the control plane for evaluation. Similarly, a control plane, as used herein, can include CRM and/or hardware to evaluate security intelligence obtained from the data plane to evaluate a number of different security policies for implementation in the network 103. As discussed further herein, the control plane can include a PPE 111.

Figure 2:
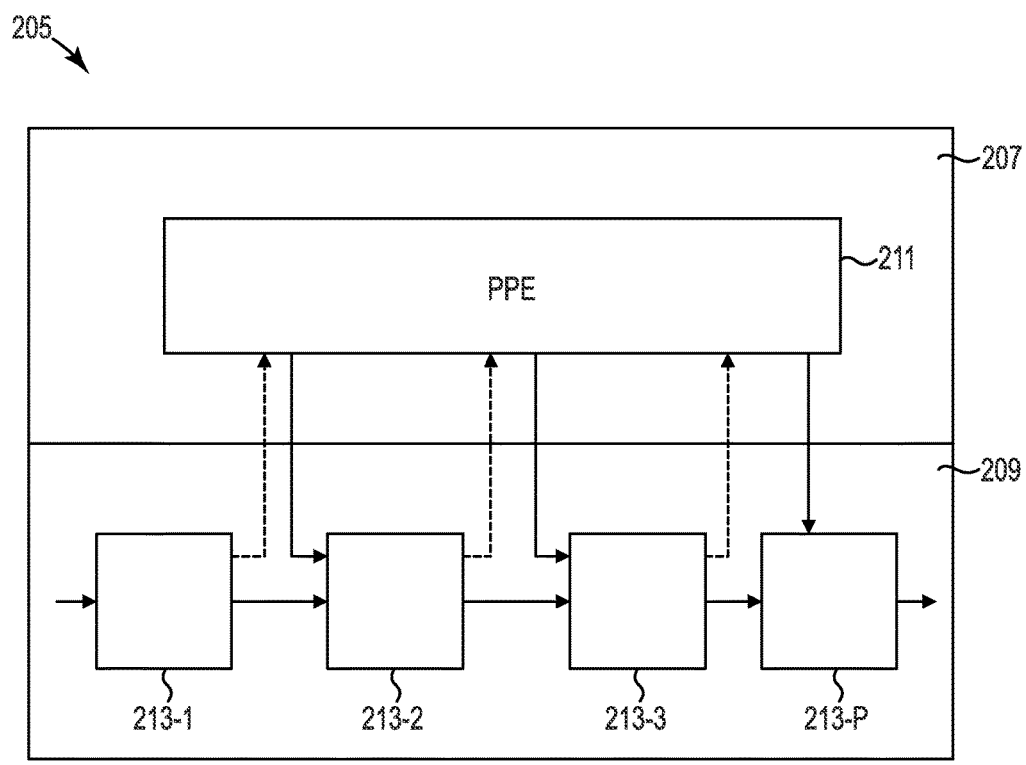
FIG. 2 is a flow diagram of an integrated network security system according to the present disclosure.

FIG. 2 is a flow diagram of an integrated network security system 205 according to the present disclosure. As discussed in relation to FIG. 1, an integrated network security system (e.g., the unified control and data plane architecture) 205 can include a control plane 207 and/or a data plane 209. In a number of examples, the control plane 207 can include a PPE 211. Similarly, the data plane 209 can include a number of network security systems 213-1, 213-2, ..., 213-P. While the present example illustrates four network security systems, examples in accordance with the present disclosure are not so limited. For instance, an environment can include more or fewer network security systems than illustrated in FIG. 2. Additionally, each network security system can be a different type (e.g., a FW is a different type of network security system than an IPS), and/or a subset of the number of network security systems 213-1, 213-2, ..., 213-P can be a same type (e.g., a first network security system and a third network security system can be a FW).

As illustrated in FIG. 2, a PPE 211 can utilize a dynamic feedback loop from a number of network security systems 213-1, ..., 213-P. A dynamic feedback loop can include a continuous, asynchronous, and/or periodic transmission of security policy results from a network security system (e.g., particular network security system 213-1) to the PPE 211, and back to the number of network security systems 213-1, ..., 213-P. For example, a first network security system 213-1 (e.g., a FW) can implement policies associated with that particular network security system on network traffic. That is, the first network security system 213-1 can analyze network data packets, analyze where network data packets are coming from (e.g., a data source) and/or going to, analyze Internet Protocol (IP) addresses, and/or block or allow data packets from entering the network based on a set of security policies. The first network security system 213-1 (e.g., the FW), can then transmit to the PPE 211, information regarding network traffic and specific security policies affected by the observed network traffic. In a number of examples, the PPE 211 can store information regarding network traffic and security policies executed by the network security systems 213-1, ..., 213-P in a historical database for policy reassessment, as discussed further herein.

In a number of examples, PPE 211 can evaluate information regarding network traffic received from the first network security system 213-1, and can transmit revised security intelligence to a second network security system 213-2. Revised security intelligence can include some and/or all of the security intelligence obtained from a network security system (e.g., the number of network security systems 213-1, ..., 213-P), and can be used to more effectively address potential attacks and/or threats facing the network. In some examples, revised security intelligence can include security intelligence obtained from a historical database in the PPE 211. The second network security system 213-2 can be different from the first network security system 213-1. For example, the second network security system 213-2 can include an AIS. That is, the AIS can analyze network traffic passed on from the first network security system 213-1, analyze the context of the network traffic, and identify a number of applications executed in the network traffic. For instance, the AIS (e.g., the second network security system 213-2) can identify that Facebook® is executed in the network traffic, and/or a particular website is browsed, and transmit that security intelligence to the PPE 211.

PPE 211 can evaluate security intelligence obtained from the first network security system 213-1, and security intelligence obtained from the second network security system 213-2, and transmit revised security intelligence to a third network security system 213-3. For example, the third network security system 213-3 can include an IPS. That is, the IPS (e.g., the third network security system 213-3) can detect an abnormal traffic pattern (e.g., malicious traffic) with a particular network connection, and can transmit security intelligence regarding the identified abnormal traffic pattern to the PPE 211. For instance, the IPS can establish filters, determine which filters to use to block the network traffic, and/or can decide not to block the network traffic. The PPE 211, in response to receiving security intelligence from the third network security system 213-3, can update the historical database to include the received security intelligence.

In a number of examples, the dynamic feedback loop can terminate after the three network security systems (e.g., the first network security system 213-1, the second network security system 213-2, and the third network security system 213-3) have executed their respective security policies, and the PPE 211 can assess available security policies to implement based on the security intelligence obtained. In other examples, the dynamic feedback loop can terminate after a number of network security systems 213-1, 213-2, 213-3, ..., 213-P have executed their respective security policies.

A PPE 211 can dynamically re-assess policies based on security intelligence obtained from the number of network security systems 213-1, ..., 213-P. As illustrated in FIG. 2, as each network security system executes security policies to evaluate the network traffic, the respective network security system can send security intelligence to the PPE 211. In response, the PPE 211 can evaluate the security intelligence received and determine a risk value. As used herein, a risk value can include a numerical, alpha, and/or alphanumeric sequence identifying a level of risk associated with a particular action. For example, a second network security system 213-2 can send security intelligence to the PPE 211 identifying a particular website that a user has visited. The PPE 211 can evaluate the received security intelligence, and can assign a risk value of 5 to the network traffic, based on the detection of the particular website. In a number of examples, the PPE 211 can then check the risk value against a user-configurable risk tolerance (e.g., a user-defined level of acceptable risk and/or a threshold level of risk), and can determine an appropriate security policy and/or security policies to implement, based on the determined risk value. In various examples, a particular risk value can be associated with a particular user, and an appropriate security policy and/or security policies can be implemented based on an identification of the particular user. Alternatively and/or in addition, the PPE 211 can evaluate received security intelligence, identify a user that has created and/or a user that is receiving network traffic, and assign a particular risk value based on the identified user creating and/or receiving the network traffic.

In a number of examples, dynamic re-assessment of policies can allow for more appropriate and/or specific selection of security policies. For example, the first network security system 213-1 can execute security policies to evaluate the network traffic, and send security intelligence to PPE 211. In response to receiving the security intelligence from the first network security system 213-1, PPE 211 can assign a risk value to the network traffic. For instance, the PPE 211 can assign a risk value of 2 based on security intelligence received from the first network security system 213-1. Subsequently, the PPE 211 can transmit revised security intelligence to a second network security system 213-2, including security intelligence received from the first network security system 213-1, and/or information contained in the historical database. Based on the revised security intelligence received by the second network security system 213-2, and the risk value of 2, different security policies may be executed by network security system 213-2. Subsequently, the second network security system 213-2 can execute select security policies, and transmit security intelligence to the PPE 211. Based on the security intelligence received from the second network security system 213-2, the PPE 211 can re-assess the risk value, and assign a risk value of 8. In response to the revised risk value, all of the network security systems (e.g., the number of network security systems 213-1, . . . , 213-P) can revise which security policies are executed to address the higher risk associated with the network traffic.

In a number of examples, PPE 211 can calculate a weighted risk value which is continuously calculated until it reaches a threshold level of risk. The threshold level of risk can, for instance, be defined by user and/or a system administrator. For instance, security intelligence obtained from the first network security system 213-1 may result in an assigned risk value of 3. Subsequently, security intelligence obtained from the second network security system 213-2 may result in an assigned risk value of 5, and a weighted risk value of 8 (e.g., 3+5). Subsequently, security intelligence obtained from the third network security system 213-3 may result in an assigned risk value of 10, and a weighted risk value of 18 (e.g., 3+5+10). If, for example, the defined threshold level of risk as 15, a weighted risk value of 18 can prompt the execution of a particular security policy. A security policy, as used herein, can include a number of different actions used to protect network integrity. For instance, a security policy can include encrypting and/or decrypting network traffic, Uniform Resource Locator (URL) filtering, blocking and/or allowing network traffic, rate limiting network traffic, and/or applying transformations to network traffic.

In various examples, a number of security policies can be identified for execution based on a weighted risk value. For instance, based on a weighted risk value of 5, the PPE 211 may recommend a first set of security policies to be executed by a number of network security systems 213-1, . . . , 213-P. Similarly, based on a weighted risk value of 25, the PPE 211 may recommend a second set of security policies to be executed by the number of network security systems 213-1, . . . , 213-P, wherein the second set of security policies includes greater security measures than the first set of security policies.

Figure 3:
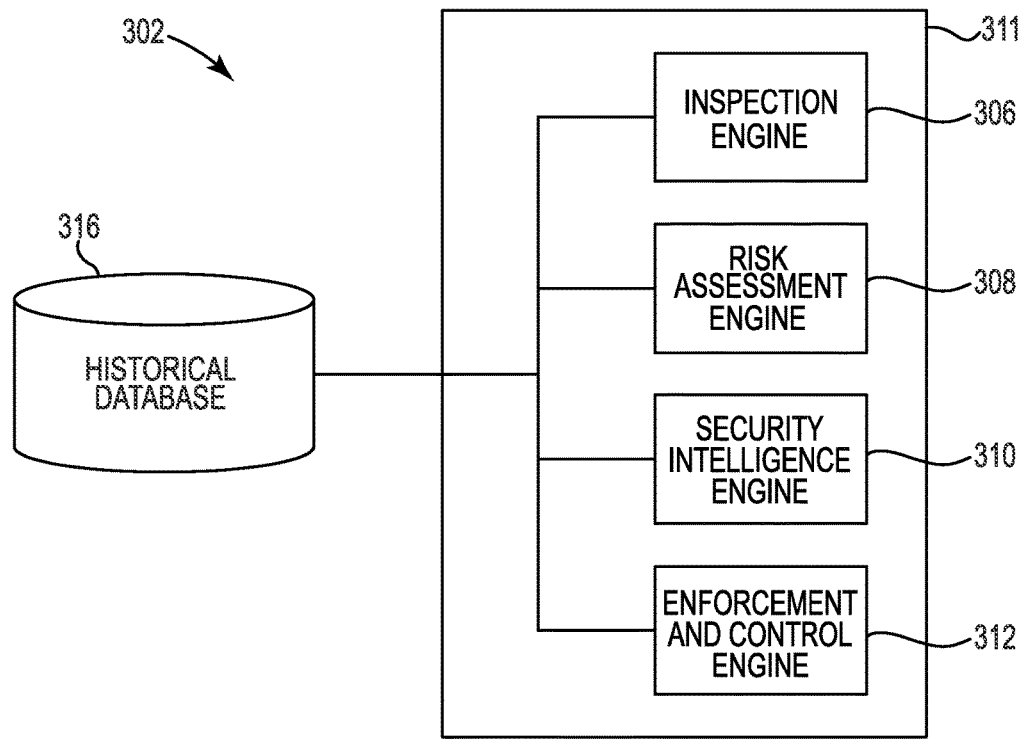
FIGS. 3-4 illustrate examples of systems according to the present disclosure.
Figure 4:
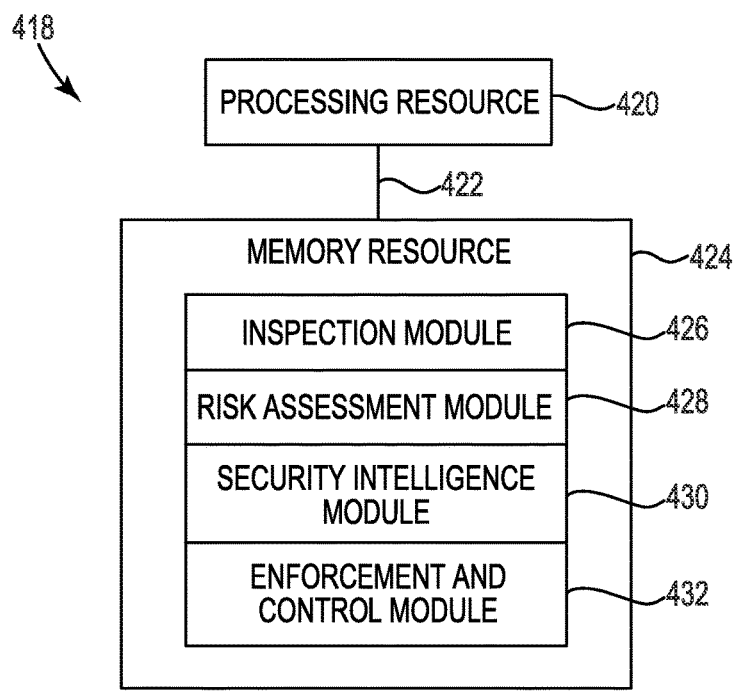

FIGS. 3-4 further illustrate examples of systems 302, 318 according to the present disclosure. FIG. 3 illustrates a diagram of an example of an integrated network security system 302 for dynamic network security policy reassessment according to the present disclosure. The integrated network security system 302 can include a historical database 316, a PPE 311, and/or a number of engines 306, 308, 310, 312. The PPE 311 can be in communication with the historical database 316 via a communication link, and can include the number of engines (e.g., inspection engine 306, risk assessment engine 308, security intelligence engine 310, enforcement and control engine 312, etc.). However, examples are not so limited. For instance, PPE 311 can include historical database 316, as well as the number of engines 306, 308, 310, and 312. Additionally, the PPE 311 can include additional or fewer engines than illustrated to perform the various functions described herein.

The number of engines can include a combination of hardware and programming that is configured to perform a number of functions described herein (e.g., inspect network traffic for vulnerabilities, threats, and/or security attacks). The programming can include program instructions (e.g., software, firmware, etc.) stored in a memory resource (e.g., computer readable medium, machine readable medium, etc.) as well as hard-wired program (e.g., logic).

The inspection engine 306 can include hardware and/or a combination of hardware and programming to inspect (e.g., monitor) network traffic. As discussed in relation to FIGS. 1 and 2, an entity can implement network security systems to protect against vulnerabilities in their networks. Network security systems can inspect network traffic for vulnerabilities, threats, and/or security attacks. In a number of examples, the inspection engine 306 can asynchronously inspect network traffic for vulnerabilities, threats, and/or security attacks. That is, a number of events may occur in a particular string of network traffic, and particular events in that network traffic may be inspected using a different network security system. For example, a FW may identify packets for establishing a Transmission Control Protocol (TCP) connection, and may send security intelligence indicating that the TCP connection is "establishing connection" to a PPE 311. Subsequently, a reputation engine may perform a search query on the IP addresses included in the TCP connection, and may send security intelligence including "IP risk and categorization" information to the PPE 311. Further, an AIS may identify a number of applications included in the TCP connection, and may send security intelligence indicating "application identified" to the PPE 311. Upon detecting an abnormal (e.g., potentially malicious) pattern of traffic in the TCP connection, an IPS may send security intelligence indicating "abnormal traffic" to the PPE 311.

In various examples, the inspection engine 306 can implement the number of network security systems concurrently and/or in a random order. For instance, the inspection engine 306 can implement a first network security system and a third network security system simultaneously (e.g., concurrently). In another instance, the inspection engine 306 can implement the second network security system, followed by the first network security system, followed by the third network security system.

The risk assessment engine 308 can include hardware and/or a combination of hardware and programming to assign a risk value to network traffic. For instance, as each packet of data is analyzed by the network security systems, the PPE 311 can evaluate the input parameters (e.g., establishing connection, IP risk and categorization, application identified, and abnormal traffic) and determine a risk value.

That is, a risk value can be assigned to particular IP addresses and a category can be assigned to each IP address. In another example, a risk value can be assigned to a particular application, a particular pattern of abnormal traffic, a particular user, a particular network traffic source, and/or a particular network traffic destination.

In a number of examples, the risk values assigned to each of the input parameters can be combined into a weighted risk value. For example, the risk assessment engine 308 can continuously evaluate events and security intelligence obtained from a number of different network security systems, and continuously calculate the weighted (e.g., combined) risk value for the network traffic. In some examples, a user and/or system administrator can be notified when a threshold level of risk is exceeded. The threshold level of risk can include a pre-determined level of risk that when achieved, requires an additional security policy and/or security policies to be implemented. The threshold level of risk can be modified by a user and/or system administrator to account for periods of increased and/or decreased network security.

The security intelligence engine 310 can include hardware and/or a combination of hardware and programming to log network traffic in the historical database 316. For instance, each time that a network security system transmits security intelligence to the PPE 311, the security intelligence engine 310 can record (e.g., store) the security intelligence in the historical database 316. The historical database 316 can include a cache that identifies a number of features associated with particular network traffic, for efficient identification in future transactions. For example, if a reputation engine identifies a particular IP address as a potentially malicious host address, security intelligence identifying the particular IP address can be stored in the historical database 316 via the security intelligence engine 310.

In a number of examples, the security intelligence engine 310 can include hardware and/or a combination of hardware and programming to cross correlate network traffic. For instance, an AIS can identify a particular application executed in network traffic, and the particular application may be assigned a risk value by the risk assessment engine 308. The security intelligence pertaining to the particular application can be stored in the historical database 316 and cross correlated by the security intelligence engine 310, such that the particular application can be subsequently identified, and the risk value analyzed, by a different network security system.

The enforcement and control engine 312 can include hardware and/or a combination of hardware and programming to control network traffic in response to determined risk values. A risk value can be assigned to particular packets of data in network traffic. The enforcement and control engine 312 can execute, implement, and/or recommend particular security policies to address the particular packets of data and/or other packets of data that may pose a risk to network security. For instance, enforcement and control engine 312 can execute, implement, and/or recommend particular security policies to be executed by a second network security system (e.g., second network security system 213-2, as illustrated in FIG. 2), based on security intelligence obtained from a first network security system (e.g., first network security system 213-1, as illustrated in FIG. 2). In another instance, enforcement and control engine 312 can execute, implement, and/or recommend particular security policies to be executed by the first network security system (e.g., first network security system 213-1, as illustrated in FIG. 2), based on security intelligence obtained from the second network security system (e.g., second network security system 213-2, as illustrated in FIG. 2). In a number of examples, security policies (e.g., control actions) implemented by the enforcement and control engine 312 can include prompting a user and/or system administrator for recommendations. In other examples, security policies can be automatically executed and/or implemented in response to a particular user-configurable threshold being exceeded.

FIG. 4 illustrates a diagram of an example of a computing device 418 according to the present disclosure. The computing device 418 can utilize software, hardware, firmware, and/or logic to perform a number of functions herein.

The computing device 418 can be any combination of hardware and program instructions configured to share information. The hardware for example can include a processing resource 420 and/or a memory resource 424 (e.g., computer-readable medium (CRM), machine readable medium (MRM), database, etc.) A processing resource 420, as used herein, can include any number of processors capable of executing instructions stored by a memory resource 424. Processing resource 420 may be integrated in a single device or distributed across multiple devices. The program instructions (e.g., computer-readable instructions (CRI)) can include instructions stored on the memory resource 424 and executable by the processing resource 420 to implement a desired function (e.g., to determine a risk value associated with identified network traffic).

The memory resource 424 can be in communication with a processing resource 420. A memory resource 424, as used herein, can include any number of memory components capable of storing instructions that can be executed by processing resource 420. Such memory resource 424 can be a non-transitory CRM or MRM. Memory resource 424 may be integrated in a single device or distributed across multiple devices. Further, memory resource 424 may be fully or partially integrated in the same device as processing resource 420 or it may be separate but accessible to that device and processing resource 420. Thus, it is noted that the computing device 418 may be implemented on a participant device, on a server device, on a collection of server devices, and/or a combination of the user device and the server device.

The memory resource 424 can be in communication with the processing resource 420 via a communication link 422 (e.g., a path). The communication link 422 can be local or remote to a machine (e.g., a computing device) associated with the processing resource 420. Examples of a local communication link 422 can include an electronic bus internal to a machine (e.g., a computing device) where the memory resource 424 is one of volatile, non-volatile, fixed, and/or removable storage medium in communication with the processing resource 420 via the electronic bus.

A number of modules 426, 428, 430, 432 can include CRI that when executed by the processing resource 420 can perform a number of functions. The number of modules 426, 428, 430, 432 can be sub-modules of other modules. For example, the inspection module 426 and the risk assessment module 428 can be sub-modules and/or contained within the same computing device. In another example, the number of modules 426, 428, 430, 432 can comprise individual modules at separate and distinct locations (e.g., CRM, etc.).

Each of the number of modules 426, 428, 430, 432 can include instructions that when executed by the processing resource 420 can function as a corresponding engine as described herein. For example, the inspection module 426 can include instructions that when executed by the processing resource 420 can function as the inspection engine 306 (e.g., as illustrated in FIG. 3). In another example, the risk assessment module 430 can include instructions that when executed by the processing resource 420 can function as the inspection engine 310 (e.g., as illustrated in FIG. 3). In various examples, the security intelligence module 430 can function as the security intelligence engine 310 (e.g., as illustrated in FIG. 3) and/or the enforcement and control engine 432 can function as the enforcement and control engine 312 (e.g., as illustrated in FIG. 3).

Figure 5:
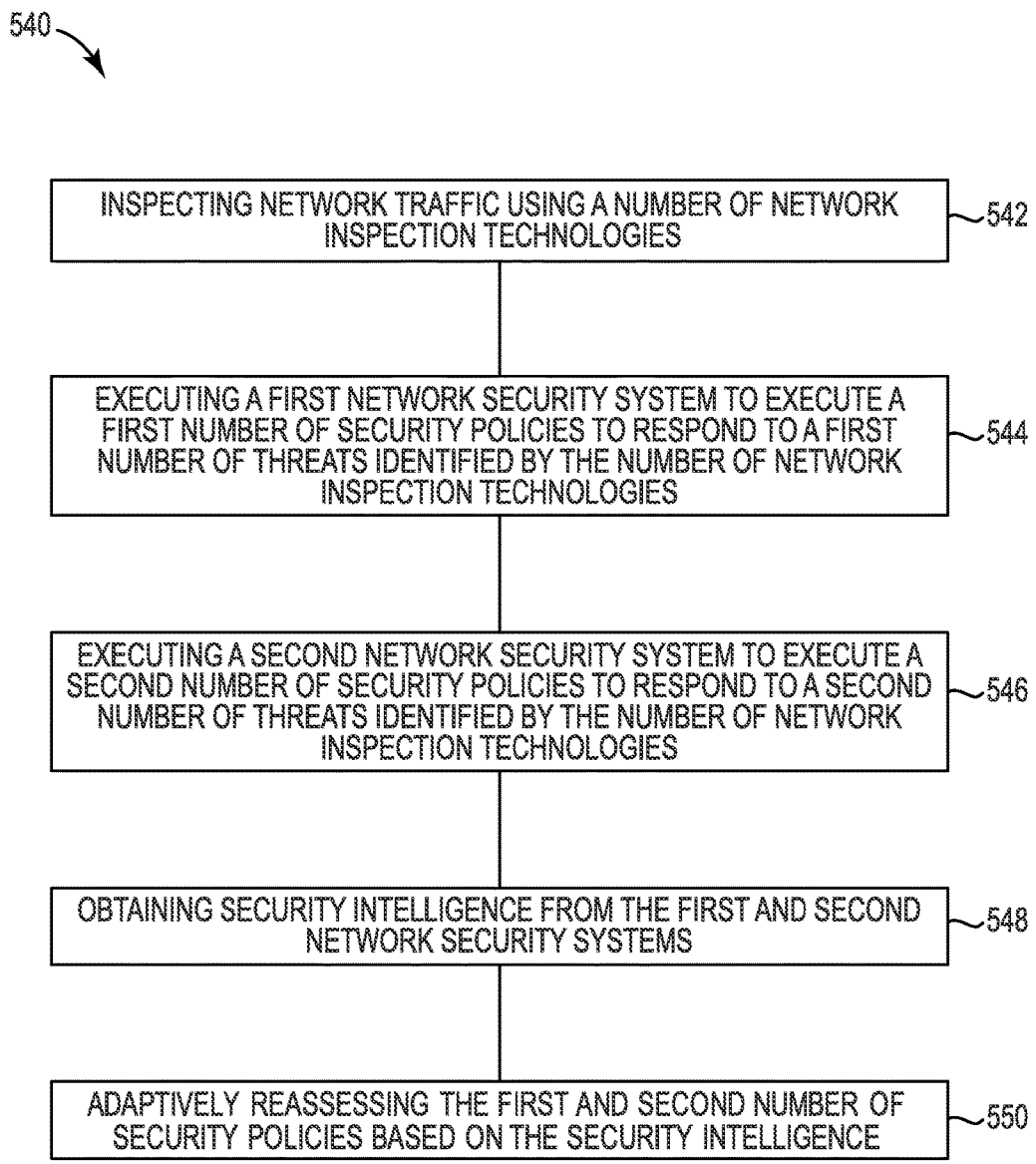
FIG. 5 illustrates a flow chart of an example of a method for adaptive network security policy reassessment according to the present disclosure.

FIG. 5 illustrates a flow chart of an example of a method 540 for dynamic network security policy reassessment according to the present disclosure.

At 542, the method 540 can include inspecting network traffic using a number of network inspection technologies. A network inspection technology can include hardware and/or a combination of hardware and programming to monitor network traffic for vulnerabilities, threats, and/or attacks. In a number of examples, an inspection technology can also include a network security system. However, examples are not so limited and a network inspection technology and a network security system can be mutually exclusive systems.

At 544, the method 540 can include executing a first network security system to execute a first number of security policies to respond to a first number of threats identified by the number of network inspection technologies. For example, a first network security system can include a FW, which executes security policies associated with a FW. For instance, the FW can evaluate network traffic and block and/or allow traffic (e.g., data packets) based on the security policies associated with the FW. In a number of examples, the security policies associated with the number of network security systems can be stored in a historical database.

At 546, the method 540 can include executing a second network security system to execute a second number of security policies to respond to a second number of threats identified by the number of network inspection technologies. For example, a second network security system can include an AIS which identifies applications and sends information associated with the identified applications to the historical database. In a number of examples, the second network security system is different than the first network security system, although examples are not so limited.

At 548, the method 540 can include obtaining security intelligence from the first and second network security systems. As described herein, security intelligence can include information regarding security attacks, threats and/or vulnerabilities. For instance, security intelligence can include an IP address identifying a host of a security attack. In another example, security intelligence can include information identifying a pattern of abnormal network traffic that has and/or could potentially be, related to a security attack, threat and/or vulnerability. As each network security system analyzes network traffic, information (e.g., security intelligence) obtained from that network security system, can be saved in a historical database for reassessment of security policy applications. Security intelligence contained in the historical database may be used to retroactively update security policies (e.g., update security policies for network security systems that have already analyzed the network traffic). In other examples, security intelligence contained in the historical database may be used to proactively update security policies (e.g., update security policies for network security systems that have not yet analyzed the network traffic).

At 550, the method 540 can include dynamically reassessing the first and second number of security policies based on the security intelligence. Dynamically reassessing can include continuous transmission of security policy results from a network security system to a PPE and back to the number of network security systems. For example, once a second network security system has analyzed network traffic and obtained security intelligence from it, the security intelligence can be transmitted to a PPE which in turn transmits the security intelligence to other network security systems. The PPE may also revise which security policies are executed by the other network security systems, based on the security intelligence and/or the historical database, and communicate such revisions to the network security systems.

In the detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure.

In addition, the proportion and the relative scale of the elements provided in the figures are intended to illustrate the examples of the present disclosure, and should not be taken in a limiting sense. As used herein, the designators "N" and "P", particularly with respect to reference numerals in the drawings, indicate that a number of the particular feature so designated can be included with a number of examples of the present disclosure.

What is claimed:

1. A system comprising:
   a first network security system that is configured to receive network traffic in a computer network, inspect the network traffic using a first set of security policies to generate first security intelligence associated with the network traffic, and forward the first security intelligence to a policy computer over the computer network;
   the policy computer that is configured to receive the first security intelligence from the first network security system over the computer network, generate revised first security intelligence that include information from the first security intelligence and information from other security intelligence, and forward the revised first security intelligence to a second network security system over the computer network; and
   the second network security system that is configured to receive the network traffic over the computer network, receive the revised first security intelligence from the policy computer over the computer network, identify a second set of security policies based on the revised first security intelligence, and inspect the network traffic using the second set of security policies to generate second security intelligence associated with the network traffic,
   wherein the policy computer is configured to store the first security intelligence associated with the network traffic in a historical database,
   wherein the second network security system is configured to forward the second security intelligence associated with the network traffic to the policy computer over the computer network,
   wherein the policy computer is configured to receive the second security intelligence, generate revised second security intelligence that include information from the second security intelligence and information from the historical database, and forward the revised second security intelligence from the policy computer to a third network security system over the computer network, and wherein the first network security system comprises a firewall (FW), the second network security system comprises an application identification system (AIS), and the third network security system comprises an intrusion prevention system (IPS).

2. The system of claim 1, wherein the revised first security intelligence include information from the historical database.

3. The system of claim 1, further comprising:

the third network security system that is configured to receive the network traffic over the computer network, receive the revised second security intelligence from the policy computer, identify a third set of security policies based on the revised second security intelligence, and inspect the network traffic using the third set of security policies to generate third security intelligence associated with the network traffic.

4. A method for dynamic identification of network security policies, the method comprising:

inspecting network traffic in a plurality of network security systems;

implementing a first security policy to respond to a first threat identified by a first network security system of the plurality of network security systems;

implementing a second security policy to respond to a second threat identified by a second network security system of the plurality of network security systems;

obtaining security intelligence from the first and second network security systems;

identifying a third security policy based on the security intelligence; and implementing the third security policy in a third network security system of the plurality of network security systems, wherein the first network security system comprises a firewall (FW), the second network security system comprises an application identification system (AIS), and the third network security system comprises an intrusion prevention system (IPS).

5. The method of claim 4, further comprising:

storing the security intelligence in a historical database.

6. The method of claim 5, wherein the third security policy is identified based on the security intelligence and other security intelligence stored in the historical database.

* * * * *